United States Patent [19]

Aonuma et al.

[11] Patent Number: 4,689,377

[45] Date of Patent: Aug. 25, 1987

[54] RUBBER VULCANIZATE FROM ALKYLENE SULFIDE AND EPIHALOHYDRIN

[75] Inventors: Mitsuyoshi Aonuma, Tokyo; Akio Maeda; Hirokatsu Seya, both of Yokohama, all of Japan

[73] Assignee: Nippon Zeon Co., Ltd., Tokyo, Japan

[21] Appl. No.: 838,818

[22] Filed: Mar. 12, 1986

[30] Foreign Application Priority Data

Mar. 15, 1985 [JP] Japan .................. 60-50354

[51] Int. Cl.$^4$ .................. C08G 75/06; C08J 3/24
[52] U.S. Cl. .................. 525/523; 525/535; 525/539; 528/380

[58] Field of Search .................. 528/380; 525/523, 535, 525/539

[56] References Cited

U.S. PATENT DOCUMENTS 3,324,051 6/1967 Lal .................. 528/380

Primary Examiner—Harold D. Anderson
Attorney, Agent, or Firm—Sherman and Shalloway

[57] ABSTRACT

A vulcanizate of a copolymer rubber comprising 15 to 70 mol % of an alkylene sulfide, 30 to 85 mol % of an epihalohydrin and 0 to 15 mol % of an unsaturated epoxide, said vulcanizate being used in contact with an alcohol mixed gasoline.

11 Claims, No Drawings

RUBBER VULCANIZATE FROM ALKYLENE SULFIDE AND EPIHALOHYDRIN

This invention relates to a vulcanizate of an alkylene sulfide-epihalohydrin copolymer rubber having excellent oil resistance, cold resistance and heat resistance, said vulcanizate being used in contact with an alcohol mixed gasoline.

In the usage of rubber materials requiring an oil resistance, a chloroprene rubber (CR), a nitrile rubber (NBR), an epichlorohydrin rubber (CHR), an epichlorohydrin-ethylene oxide copolymer rubber (CHC), an acrylic rubber and a fluororubber have been hitherto selectively used depending on individual purposes. Especially, since auto parts used in contact with a gasoline, such as hoses, seals, gaskets, O-rings and diaphragms need a high oil resistance, NBR, CHR, CHC, the acrylic rubber and the nitrile rubber have been so far employed.

However, as a worldwide development of an energy replacing a petroleum, the use of a gasoline mixed with alcohols such as ethanol and methanol has been recently studied in countries and already put to practical use. When the alcohol mixed gasoline is however used as an automotive fuel, there is a great effect on rubber materials. With the use of such alcohol mixed gasoline, conventional oil-resistant rubbers are swollen too much to be used as auto parts. In particular, a methanol mixed gasoline gives a serious effect to greatly swell the rubbers. For this reason, the conventional oil-resistant rubbers could have been no longer used from the aspects of performance and safety.

On the other hand, the recent exhaust gas policy of automobiles tends to make the temperature of an atmosphere around engines higher than as usual; a gasoline is liable to oxidation and a rancid gasoline (hereinafter referred to as a "sour gasoline") is circulated, so that the conventional oil-resistant rubbers could not have been used. It has been known that such rancidity likewise occurs in the alcohol mixed gasoline. Accordingly, the rubber materials used in contact with the alcohol mixed gasoline have to meet a resistance to alcohol mixed gasoline as well as a resistance to sour gasoline. The advent of oil-resistant rubbers having much improved properties as compared to the conventional oil-resistant rubbers have been increasingly demanded.

Among the conventional oil-resistant rubbers, the fluororubber is known to be relatively superior in the aforesaid properties. However, the fluororubber has a defect that a cold resistance is notably poor, and therefore cannot be used in cold areas. In order to improve the cold resistance, the conjoint use of low-temperature plasticizer is thinkable, but on this occassion the plasticizers are extracted into the gasoline while in practical use, securing no effect of improvement over a long period of time.

Accordingly, an object of this invention is to provide a rubber vulcanizate having well-balanced properties such as an oil resistance, a resistance to alcohol mixed gasoline, a resistance to alcohol mixed sour gasoline, a cold resistance, a heat resistance and a weatherability, said vulcanizate being used in contact with an alcohol mixed gasoline.

The above object of this invention is achieved by a vulcanizate of a copolymer rubber comprising 15 to 70 mol% of an alkylene sulfide, 30 to 85 mol% of an epihalohydrin and 0 to 15 mol% of an unsaturated epoxide, said vulcanizate being used in contact with an alcohol mixed gasoline.

Examples of the alkylene sulfide in this invention are epithiofluorohydrin, epithiochlorohydrin, epithiobromohydrin, epithioiodohydrin, ethylene sulfide, propylene sulfide, butene sulfide, isobutylene sulfide, cyclohexene sulfide, styrene sulfide, p-chlorostyrene sulfide, p-chloromethylstyrene sulfide, methylthioglycidyl ether, ethylthioglycidyl ether, allylthioglycidyl ether, phenylthioglycidyl ether, methylthioglycidylthio ether, allylthioglycidylthio ether, phenylthioglycidylthio ether, thioglycidyl (meth)acrylate and γ-thioglycidyloxypropyl trimethoxysilane. Of these, epithiochlorohydrin, ethylene sulfide and methylthioglycidyl ether are most preferable.

Examples of the epihalohydrin in this invention are epifluorohydrin, epichlorohydrin, epibromohydrin and epiiodohydrin. Of these, epichlorohydrin is preferable.

Examples of the unsaturated epoxide in this invention are epoxide compounds having a carbon-carbon unsaturated double bond, such as butadiene monoxide, allylglycidyl ether and glycidyl (meth)acrylate.

The copolymer rubber in this invention has a composition such that an alkylene sulfide is 15 to 70 mol%, preferably 20 to 50 mol%, an epihalohydrin is 30 to 85 mol%, preferably 40 to 80 mol% and an unsaturated epoxide 0 to 15 mol%, preferably 0 to 10 mol%. Where the alkylene sulfide content is less than 15 mol%, properties such as an oil resistance and a cold resistance cannot be improved. Where it exceeds 70 mol%, properties such as a heat resistance decrease. An unsaturated epoxide may be contained if required. Especially, in a copolymer rubber having a low content of an alkylene sulfide, properties such as a cold resistance and a resistance to alcohol mixed sour gasoline are improvable by introducing an unsaturated epoxide. However, when the unsaturated epoxide content exceeds 15 mol%, a balance of properties is lost. By the way, the copolymer rubber in this invention may optionally contain an alkylene oxide such as ethylene oxide or propylene oxide as a copolymerizable component within the range of 0 to 50% by weight. Moreover, the copolymer rubber of this invention has usually a Mooney viscosity of 10 to 150.

The copolymer rubber in this invention can be preferably prepared by copolymerizing an alkylene sulfide, an epihalohydrin and optionally an unsaturated epoxide and further optionally an alkylene oxide in the presence of a catalyst obtained by reacting an organoaluminum compound, a compound having a bond P—OH in a molecule, a compound containing nitrogen, phosphorus or sulfur, an alkylene oxide and optionally a Lewis acid compound.

The vulcanizing agent used to produce the vulcanizate of the copolymer rubber in this invention is usually one which causes a vulcanization reaction via a halogen of the rubber. Examples of such vulcanizing agent are thioureas, polyamines, alkali metal salts, thiuram polysulfides and mercaptotriazine compounds. Of these, thioureas such as 2-mercaptoimidazoline described in Japanese Patent Publication No. 5758/68 and mercaptotriazines represented by the following formula are preferable from the aspect of a balance of vulcanizing properties.

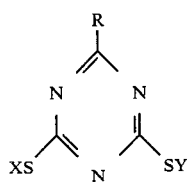

wherein X and Y each denote hydrogen, an alkali metal or an alkaline earth metal, R denotes $OR_1$, $SR_1$ or $NR_1R_2$ in which $R_1$ and $R_2$ each denote hydrogen or a hydrocarbon residue with 1 to 20 carbon atoms which may have a substituent, and $R_1$ and $R_2$ may together form a ring. Examples of the hydrocarbon residues $R_1$ and $R_2$ here referred to are alkyl groups such as methyl, ethyl, butyl and ethylhexyl; cycloalkyl groups such as cyclohexyl; aralkyl groups such as benzyl, methylbenzyl and ethylbenzyl; unsubstituted or substituted aryl groups such as phenyl, naphthyl, butylphenyl and hydroxy-ditert-butylphenyl; and alkenyl groups such as allyl and oleyl. Examples of the cyclic group formed by linking the groups $R_1$ and $R_2$ are a morpholino group, a piperidyl group and a pipecolyl group. Examples of such mercaptotriazines are 2,4,6-trimercapto-s-triazine; 2-methoxy, 2-ethoxy-, 2-phenoxy-, 2-butylamino-, 2-anilino-, 2-naphthylamino-, 2-dimethylamino-, 2-dimethylamino-, 2-dibutylamino-, 2-diphenylamino-, 2-dicyclohexylamino-, 2-morpholino- and 2-piperidyl-4,6-dimercapto-s-triazines; and sodium, potassium, calcium, magnesium and barium salts of these triazines.

Incidentally, in case of using an unsaturated epoxide as a copolymerizable component of a rubber, sulfur or peroxide vulcanization is possible.

The amount of the vulcanizing agent used is 0.1 to 10 parts by weight, preferably 0.2 to 5 parts by weight per 100 parts by weight of the rubber components.

In producing the vulcanizate, addition of an acid acceptor is quite useful to further improve properties of the vulcanizate. Examples of the acid acceptor are oxides, hydroxides, carbonates, carboxylates, silicates, borates and phosphites of metals of Group II in the periodic table; and oxides, basic carbonates, basic carboxylates, basic phosphites, basic sulfites and tribasic sulfates of metals of Group IVa in the periodic table. Concrete examples thereof are magnesium oxide, magnesium hydroxide, barium hydroxide, magnesium carbonate, barium carbonate, calcium oxide, calcium hydroxide, calcium carbonate, calcium silicate, calcium stearate, calcium phthalate, magnesium phosphite, calcium phosphite, zinc oxide, tin oxide, litharge, red lead, white lead, dibasic lead phthalate, dibasic lead carbonate, tin stearate, basic lead sulfite, basic tin sulfite, basic lead sulfite and tribasic lead sulfate. The amount of the acid acceptor used is 0.2 to 100 parts by weight, preferably 0.5 to 20 parts by weight per 100 parts by weight of the rubber components.

The rubber in this invention may be optionally compounded with ordinary rubber compounding ingredients such as fillers, reinforcing agents, plasticizers, processing aids and antioxidants.

In compounding the rubber with the various additives, means ordinarily utilized in the field of the rubber processing, such as a mixing roll, a Banbury mixer, a variety of kneaders, etc. can be optionally used. The resulting rubber composition can be generally formed into a vulcanizate by heating at 100° to 200° C. A vulcanization time is commonly 1 to 120 minutes though varied depending on the temperature. In the vulcanization molding, it is possible to utilize a common rubber vulcanization molding method such as pressure vulcanization using a mold, injection molding, or steam oven or microwave heating.

When the resulting rubber vulcanizate is used in contact with the alcohol mixed gasoline especially as a hose, a seal, a gasket, an O-ring or a diaphragm of an automobile, it can exhibit well-balanced properties such as a resistance to alcohol mixed (sour) gasoline, an oil resistance, a weatherability, a heat resistance and a weatherability.

The following Examples illustrate this invention in more detail. Parts and percentages in Examples are all on the weight basis unless otherwise instructed.

EXAMPLE 1

A 1-liter glass vessel which had been purged with nitrogen was charged with 58 g of diethyl ether and 150 ml of a toluene solution of triisobutyl aluminum (containing 200 g of triisobutyl aluminum per liter of the solution). Subsequently, 4.4 g of orthophosphoric acid and 80 ml of a diethyl ether solution of molybdenum pentachloride (containing 22.5 g of molybdenum pentachloride per liter of the solution) were added while keeping the temperature at −10° C. After the temperature was gradually returned to room temperature, 3.4 g of diethylaminoacetonitrile was added, and the mixture was reacted at 50° C. for 1 hour. While maintaining the temperature at −50° C., 8.3 g of epichlorohydrin was then added, followed by gradually returning the temperature to room temperature. In this manner, a catalyst resulted.

A 5-liter stainless steel polymerization reactor was purged with nitrogen and then charged with ethylene sulfide, epichlorohydrin, allylglycidyl ether and toluene in amounts shown in Table 1. While keeping the temperature at 3° C., the above formed catalyst was gradually added, and the mixture was polymerized at 3° C. for 24 hours. After the polymerization terminated, the reaction mixture was solidified with a large amount of methanol and dried under reduced pressure at 60° C. for 24 hours. There resulted copolymer rubbers A–G. Yields, Mooney viscosities and compositions of the resulting copolymer rubbers are shown in Table 1. The compositions were found by elemental analysis (analysis of S and Cl) or $^{13}$C-NMR spectrum.

TABLE 1

| | Sample | | | | | | |
|---|---|---|---|---|---|---|---|
| | A | B | C | D | E | F | G |
| Amount of monomer (g) | | | | | | | |
| Ethylene sulfide | 55 | 125 | 180 | 250 | 320 | 123 | 119 |
| Epichlorohydrin | 345 | 275 | 270 | 250 | 180 | 254 | 237 |
| Allylglycidyl ether | — | — | — | — | — | 23 | 44 |
| Toluene (g) | 2000 | 2000 | 2250 | 2500 | 2500 | 2000 | 2000 |
| Amount of catalyst (ml) | 150 | 180 | 220 | 280 | 300 | 180 | 180 |
| Yield (g) | 261 | 255 | 277 | 276 | 231 | 262 | 271 |
| Mooney viscosity | 80 | 64 | 54 | 43 | 34 | 68 | 70 |
| Composition of copolymer rubber (mol %) | | | | | | | |
| Ethylene sulfide | 9 | 25 | 34 | 41 | 57 | 24 | 23 |
| Epichlorohydrin | 91 | 75 | 66 | 59 | 43 | 73 | 70 |
| Acrylglycidyl ether | — | — | — | — | — | 3 | 7 |

Vulcanizates were prepared under vulcanization conditions shown in Table 2 according to a recipe shown in Table 2 using the resulting copolymer rubber samples A-G and typical oil-resistant rubbers, i.e. CHC (Herclor C85; a tradename for a product made by Hercules Inc.), CHR (Herclor H; a tradename for a produce made by Hercules Inc.), NBR (Nipol DN 103; a tradename for a product made by Nippon Zeon Co., Ltd.), a fluororubber (Tecnoflon FOR 45; a tradename for a product made by Montefluos S.P.A.) and a thiodiethanol rubber (Cymax 70; a tradename for a product made by American Cyanamid Company).

Subsequently, properties of the vulcanizates were measured according to JIS K-6301. The results are shown in Table 3.

TABLE 2

| | Recipe No. | | | | |
|---|---|---|---|---|---|
| | I | II | III | IV | V |
| | | | Sample | | |
| Components | A-G Herclor C85 | Herclor H | Nipol DN103 | Tecnoflon FOR45 | Cymax 70 |
| Rubber | 100 | 100 | 100 | 100 | 100 |
| HAF carbon black | — | — | — | — | 60 |
| FEF carbon black | 40 | 40 | 40 | — | — |
| MT carbon black | — | — | — | 20 | — |
| Stearic acid | — | — | 1 | — | 1 |
| Zinc oxide | — | — | 5 | — | — |
| Calcium carbonate | 5 | 5 | — | — | — |
| Magnesium oxide | 3 | 3 | — | 3 | — |
| Calcium hydroxide | — | — | — | 6 | — |
| Sulfur | — | — | 0.5 | — | 1 |
| Sorbitan monostearate | 3 | 3 | — | — | — |
| Pine tar | — | — | — | — | 0.3 |
| Carnauba wax | — | — | — | 1 | — |
| Tetramethylthiuram disulfide | — | — | 2 | — | — |
| 2-Mercaptobenzothiazole | — | — | 0.5 | — | — |
| Nickel dibutyldithiocarbamate | 1 | 1 | — | — | — |
| Nocrac B*[1] | — | — | — | — | 0.5 |
| 2,4,6-Trimercapto-s-triazine | 0.9 | 0.9 | — | — | — |
| Diphenylguanidine | — | 0.3 | — | — | — |
| Curative E*[2] | — | — | — | — | 4 |
| Vulcanizing conditions | 160° C. × 30 min. | 160° C. × 30 min. | 160° C. × 30 min. | 170° C. × 15 min. 230° C. × 24 hrs. Heat treatment | 170° C. × 30 min. 120° C. × 16 hrs. Heat treatment |

*[1]Antioxidant made by Ohuchi Shinko Kagaku Kogyo K.K.
*[2]Vulcanization accelerator made by American Cyanamid Company

TABLE 3

| | Comparative Example | This invention | | | | | | | | Comparative Example | | | |
|---|---|---|---|---|---|---|---|---|---|---|---|---|---|
| | A | B | C | D | E | F | G | Herclor H | Herclor C85 | Nipol DN103 | Tecnoflon FOR45 | Cymax 70 |
| Normal properties | | | | | | | | | | | | |
| Hardness (Hs) (JIS, point) | 73 | 81 | 84 | 88 | 96 | 85 | 81 | 73 | 73 | 63 | 69 | 74 |
| Tensile strength (Tb) (kg/cm²) | 111 | 137 | 117 | 107 | 86 | 135 | 132 | 110 | 117 | 187 | 155 | 107 |
| 100% Stress (M100) (kg/cm²) | 47 | 78 | 89 | 97 | — | 75 | 72 | 55 | 49 | 27 | 50 | 39 |
| Elongation (Eb) (%) | 480 | 280 | 220 | 170 | 50 | 270 | 290 | 360 | 430 | 610 | 200 | 290 |
| Test of ageing by air heating (135° C., 70 hrs.) | | | | | | | | | | | | |
| Hs (JIS) | 78 | 89 | 91 | 96 | 99 | 91 | 88 | 76 | 72 | 74 | — | 82 |
| ΔHs (point) | +5 | +8 | +7 | +8 | +3 | +6 | +7 | +3 | −1 | +12 | — | +8 |
| Tb (kg/cm²) | 131 | 153 | 143 | 142 | — | 149 | 147 | 125 | 126 | 73 | — | 100 |
| ΔTb (%) | +18 | +12 | +22 | +33 | — | +10 | +11 | +14 | +8 | −61 | — | −7 |
| Eb (%) | 250 | 170 | 130 | 80 | — | 130 | 140 | 210 | 300 | 100 | — | 160 |
| ΔEb (%) | −48 | −39 | −41 | −53 | — | −52 | −52 | −41 | −30 | −84 | — | −45 |
| Gehman low temperature torsion test | | | | | | | | | | | | |
| T₅ (°C.) | −16.5 | −19.5 | −20.0 | −17.5 | −17.5 | −20.0 | −20.5 | −16.5 | −34.0 | −10.0 | −11.0 | −43.0 |
| T₁₀ (°C.) | −20.0 | −23.5 | −24.5 | −25.0 | −25.0 | −25.0 | −26.0 | −19.5 | −36.5 | −12.0 | −13.0 | −52.0 |
| T₁₀₀ (°C.) | −26.0 | −29.5 | −32.0 | −34.5 | −37.5 | −31.0 | −33.0 | −24.5 | −42.5 | −17.0 | −18.5 | −63.5 |
| Dipping test | | | | | | | | | | | | |
| Percent volume change (V) after dipping in fuel oil C at 40° C. for 72 hours (%) | 35.4 | 25.4 | 17.5 | 15.0 | 10.0 | 29.9 | 31.5 | 39.1 | 37.4 | 40.9 | 9.5 | 30.1 |
| ΔV after dipping in fuel oil C/ethanol = 80/20 (volume ratio) at 40° C. for 72 hours (%) | 50.0 | 37.7 | 30.4 | 22.6 | 15.1 | 44.1 | 48.2 | 56.4 | 71.3 | 64.5 | 24.0 | 55.6 |
| ΔV after dipping in fuel oil C/methanol = 80/20 (volume ratio) at 40° C. for 72 hours (%) | 53.3 | 39.3 | 31.5 | 26.0 | 15.9 | 45.2 | 51.5 | 57.7 | 85.6 | 81.8 | 39.4 | 65.4 |
| ΔV after dipping in fuel oil C/methanol/lauroyl peroxide = 80/20/1 (volume ratio) at 40° C.* | | | | | | | | | | | | |
| ΔV after 72 hours (%) | 63.4 | 46.6 | 41.5 | 31.2 | 18.5 | 44.1 | 40.7 | 64.5 | 91.1 | 96.5 | 41.0 | 57.9 |
| Hs after 72 hours (JIS) | 41 | 56 | 61 | 68 | 75 | 51 | 44 | 47 | 42 | 28 | 53 | 30 |
| ΔHs (point) | −32 | −25 | −23 | −20 | −21 | −34 | −37 | −26 | −31 | −35 | −16 | −44 |
| ΔV after 168 hours (%) | 61.5 | 43.6 | 39.1 | 29.0 | 16.8 | 32.5 | 19.8 | 48.4 | 49.4 | 83.8 | 40.3 | dissolved |
| ΔV after 312 hours (%) | 37.7 | 29.1 | 27.5 | 22.3 | 14.0 | 13.8 | 12.6 | 41.7 | 7.1 | 56.7 | 41.0 | — |

*Test continued by exchanging a dip every 72 hours.

The data in Table 3 leads to the following conclusions.

That is, the ethylene sulfide-epichlorohydrin copolymer rubber vulcanizate in this invention has well-balanced properties such as an oil resistance, a resistance to alcohol mixed gasoline, a cold resistance, a heat resistance and a resistance to alcohol mixed sour gasoline. Moreover, as the ethylene sulfide content in the copolymer rubber increases, the vulcanizate markedly improves the oil resistance, the resistance to alcohol mixed gasoline and the cold resistance, as well as tends to minimize the percent volume change ($\Delta V$) and the change in hardness with time when dipped in an alcohol mixed sour gasoline. Since the vulcanizate contains ethylene sulfide as a component, the heat resistance somewhat decreases, but keeps an equal level to that of CHR.

NBR is an excellent oil-resistant rubber but poor in cold resistance, heat resistance and resistance to alcohol mixed gasoline. It is notably swollen in a methanol mixed gasoline in particular.

CHR is excellent in oil resistance and heat resistance but poor in resistance to alcohol mixed gasoline.

CHC is poor in resistance to alcohol mixed gasoline and resistance to alcohol mixed sour gasoline.

The thiodiethanol rubber is poor in heat resistance and resistance to alcohol mixed gasoline; it deteriorates drastically in the alcohol mixed sour gasoline in particular.

The fluororubber shows excellent properties as a whole, but has a fatal defect that the cold resistance is extremely poor.

The ethylene sulfide-epichlorohydrin-allylglycidyl ether terpolymer rubber vulcanizate in this invention exhibits approximately the same properties as the ethylene sulfide-epichlorohydrin copolymer rubber vulcanizate, but improves the cold resistance and tends to somewhat decrease the resistance to alcohol mixed gasoline.

EXAMPLE 2

Using the copolymers obtained in Example 1, compounds were prepared according to the following recipe. Subsequently, vulcanizates were formed by heating the compounds under pressure at 160° C. for 30 minutes. Properties of the vulcanizates were measured as in Example 1.

The results are shown in Table 4.

| Recipe | |
| --- | --- |
| Rubber | 100 |
| Sorbitan monostearate | 3 |
| FEF carbon black | 40 |
| Red lead | 5 |
| 2-Mercaptoimidazoline | 1.2 |
| Nickel dibutyldithiocarbamate | 1 |

TABLE 4

| | Comparative Example | | This invention | | | |
| --- | --- | --- | --- | --- | --- | --- |
| | | | Sample | | | |
| | Herclor H | Herclor C-85 | H | I | J | K |
| Composition of a copolymer in this invention (mol %) | | | | | | |
| Ethylene sulfide | | | 22 | — | — | 41 |
| Propylene sulfide | | | — | 32 | — | — |
| Methylthioglycidyl ether | | | — | — | 42 | — |
| Epithiochlorohydrin | | | — | — | — | 15 |
| Epichlorohydrin | | | 78 | 68 | 58 | 44 |
| Normal properties | | | | | | |
| Tensile strength (kg/cm²) | 127 | 126 | 114 | 108 | 101 | 83 |
| Elongation (%) | 490 | 440 | 620 | 770 | 720 | 560 |
| Hardness (JIS, point) | 67 | 69 | 73 | 63 | 65 | 76 |
| Gehman low temperature torsion test | | | | | | |
| $T_{10}$ (°C.) | −19 | −38 | −22 | −21 | −19 | −20 |
| Dipping test | | | | | | |
| Percent volume change after dipping in fuel oil C at 40° C. for 72 hours (%) | 41 | 40 | 30 | 29 | 34 | 34 |
| Percent volume change after dipping in fuel oil C/methanol = 80/20 (volume ratio) at 40° C. for 72 hours (%) | 65 | 95 | 45 | 48 | 54 | 50 |
| Percent volume change after dipping in fuel oil C/methanol/lauroyl peroxide = 80/20/1 (volume ratio) (at 40° C. for 72 hours (%)) | 66 | 99 | 51 | 51 | 58 | 53 |
| Percent volume change after dipping in fuel oil C/methanol/lauroyl peroxide = 80/20/1 (volume ratio) (at 40° C. for 144 hours* (%)) | 70 | 94 (Rubber decomposed) | 50 | 51 | 60 | 53 |

*A dip was exchanged after 72 hours.

As is apparent from the foregoing Examples, the ethylene sulfide-epichlorohydrin copolymer rubber vulcanizate in this invention is by far superior in balance of properties to the vulcanizates of oil-resistant rubbers such as NBR, CHR, CHC and fluororubber, and shows optimum properties as a rubber material used in contact with the alcohol mixed gasoline. These properties are remarkably exhibited when the copolymer rubber contains 20 to 50 mol% of ethylene sulfide.

What we claim is:

1. A vulcanizate of a copolymer rubber which is resistant to alcohol mixed gasoline comprising the polymerization reaction product of 15 to 70 mol% of an alkylene sulfide, 30 to 85 mol% of an epihalohydrin and 0 to 15 mol% of an unsaturated epoxide.

2. The vulcanizate of claim 1 where the alkylene sulfide is selected from epithiochlorohydrin, ethylene sulfide or methylthioglycidyl ether.

3. The vulcanizate of claim 1 wherein the epihalohydrin is epichlorohydrin.

4. The vulcanizate of claim 1 wherein the copolymer rubber is a copolymer of from 20 to 50 mol% of an alkylene sulfide, 40 to 80 mol% of an epihalohydrin and 0 to 10 mol% of an unsaturated epoxide.

5. The vulcanizate of claim 1 being a product obtained by vulcanization with a vulcanizing agent to cause a vulcanization reaction via a halogen in the rubber.

6. The vulcanizate of claim 5 wherein the vulcanizing agent is selected from thioureas, polyamines, alkali metal salts, thiuram polysulfides or mercaptotriazine compounds.

7. The vulcanizate of claim 1 wherein the alkylene sulfide is epithiochlorohydrin.

8. The vulcanizate of claim 1 wherein the alkylene sulfide is ethylene sulfide.

9. The vulcanizate of claim 1 wherein the alkylene sulfide is methyl thioglycidyl ether.

10. The vulcanizate of claim 1 wherein the alkylene sulfide is ethylene sulfide and the epihalohydrin is epichlorohydrin.

11. The vulcanizate of claim 1 wherein the copolymer rubber is a copolymer of ethylene sulfide, epichlorohydrin and allyl glycidyl ether.

* * * * *